Oct. 15, 1957  F. N. RAWLINGS ET AL  2,809,903
CONVERTING SUGAR AND OTHER GRANULES
Filed May 21, 1956  4 Sheets-Sheet 2
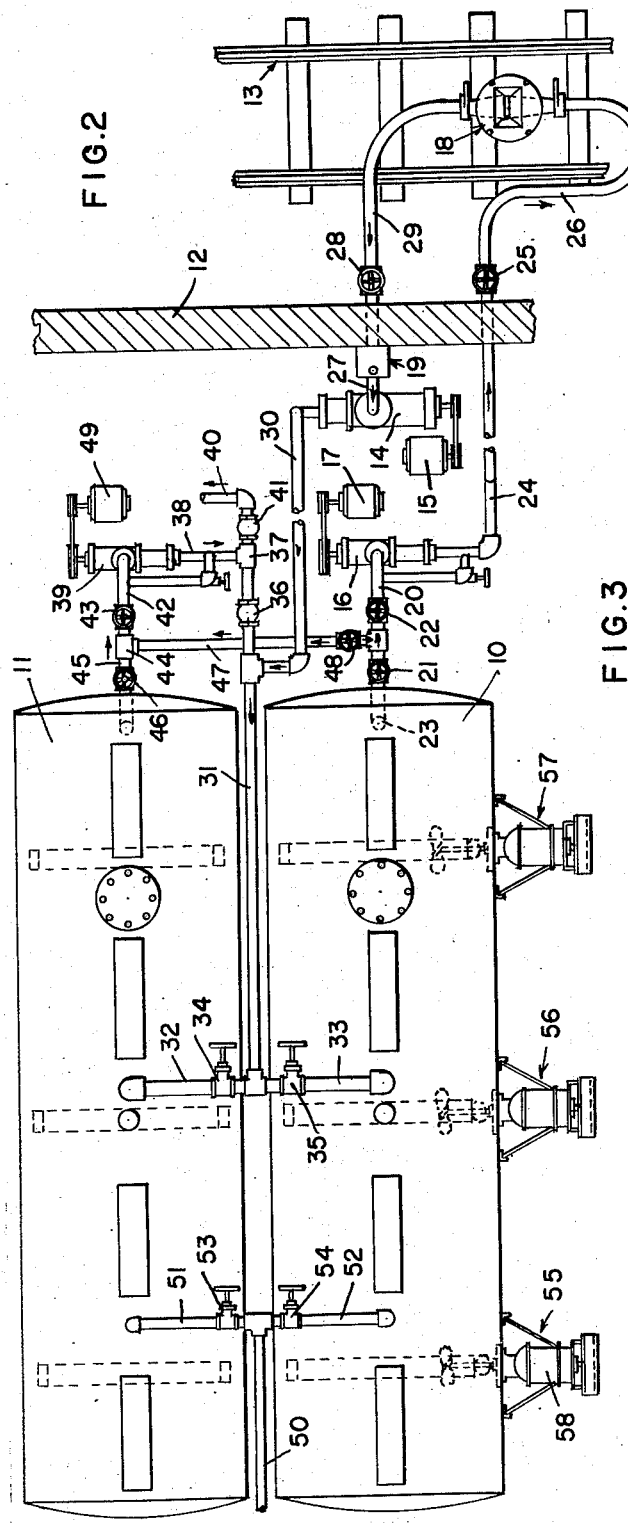
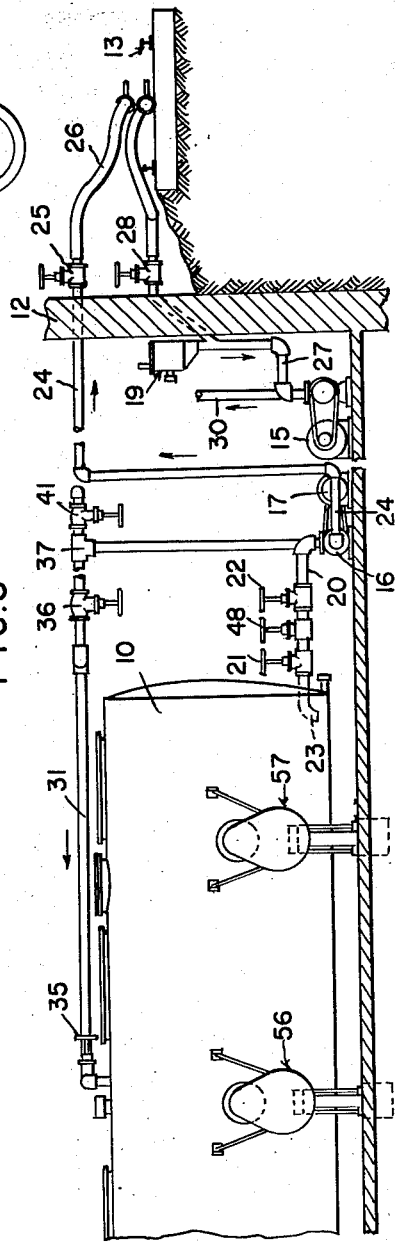
Inventors
Frank N. Rawlings
John H. Grantham
Charles C. Miller
BY
Arthur Middleton
Atty

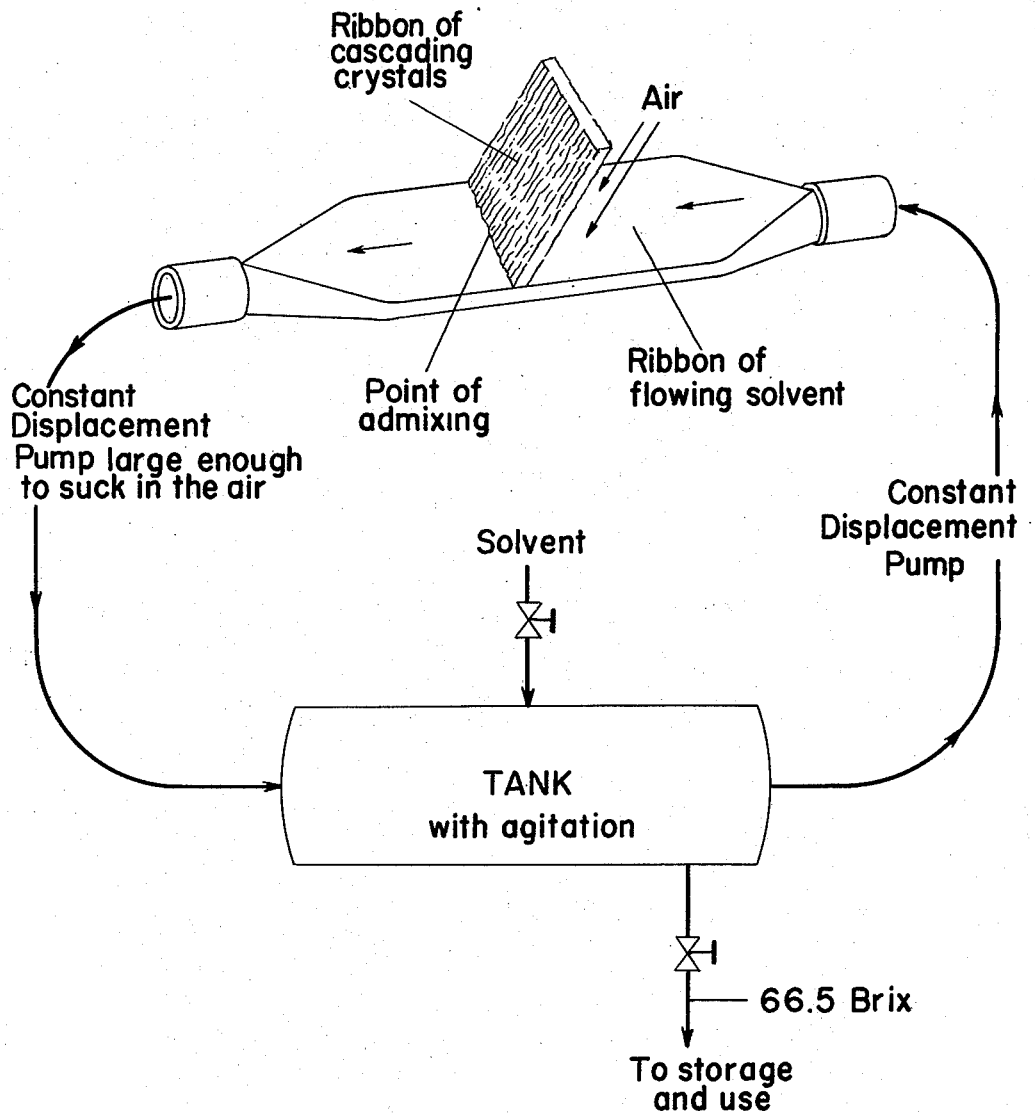

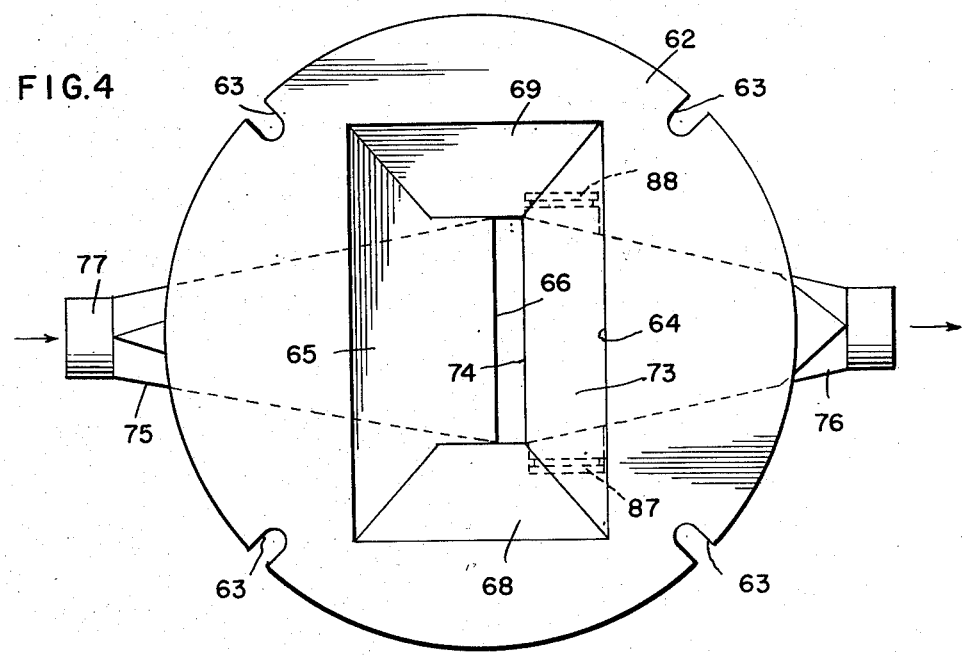
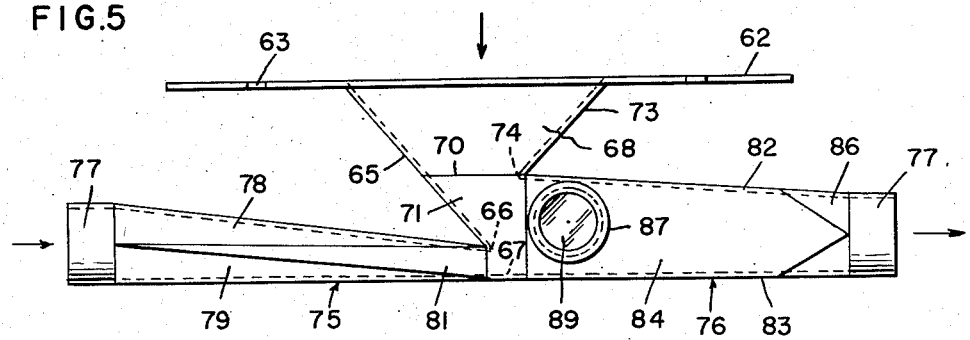
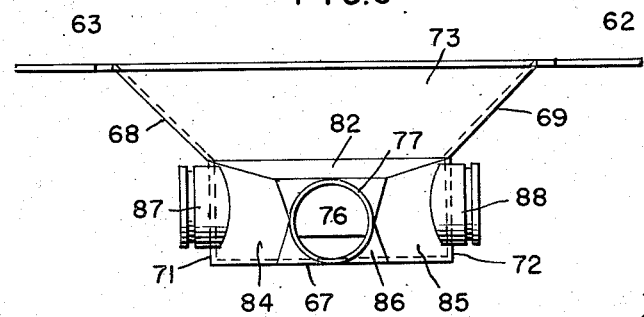
Inventors
Frank N. Rawlings
John H. Grantham
Charles C. Miller
BY
Atty Oct. 15, 1957   F. N. RAWLINGS ET AL   2,809,903
CONVERTING SUGAR AND OTHER GRANULES
Filed May 21, 1956                                4 Sheets-Sheet 4

Inventors
Frank N. Rawlings
John H. Grantham
Charles C. Miller
BY Arthur Middleton
Atty

United States Patent Office 2,809,903
Patented Oct. 15, 1957

2,809,903

CONVERTING SUGAR AND OTHER GRANULES

Frank N. Rawlings, North Ogden, and John H. Grantham, Ogden, Utah, and Charles C. Miller, Portland, Oreg., assignors to The Amalgamated Sugar Company, Ogden, Utah, a corporation of Utah Application May 21, 1956, Serial No. 586,086

13 Claims. (Cl. 127—22)

This invention relates to a system and apparatus for unloading dry granulated sugar or other solids in granular form from carriers such as rail cars, bulk sugar trucks or the like and converting the same to a water-sugar mixture, an example of which is often termed liquid sugar.

Due to the flexibility of in-plant handling and other reasons, there is an increasing demand for bulk liquid sugar. The present method of manufacture and distribution involves mechanically mixing measured amounts of hot water and dry granulated sugar in a suitable container, filtering, cooling and storing the mixture and then pumping the liquid mixture to tank trucks or railway tank cars for shipment to the user. Except in those instances where the sugar refinery is situated fairly close to the user, the freight which must be paid on the water content of the liquid sugar results in reduced economy for the sugar refiner. Standard liquid sugar contains 66.5% sugar by weight and 33.5% water by weight in order to protect the liquid sugar from biological contamination and crystallization. Therefore, the increase in freight costs of the liquid sugar as compared with dry sugar is considerable.

Accordingly, one object of this invention is to provide an improved system and apparatus for converting dry bulk granulated sugar directly to liquid sugar at or near the site at which the liquid sugar is to be used.

Another object of the invention is to provide a system for converting dry bulk sugar to liquid sugar in a minimum of time and without requiring any preheating of the dissolving water because heating and cooling constitute a major cost of current methods of producing liquid sugars.

Still another object of this invention is to provide a system for converting dry sugar to liquid sugar wherein a rapid mixing of the dry sugar and solvent is accomplished by introducing a quantity of air into the system at the point in which the dry sugar and solvent are mixed so as to achieve an agitating action in the mixture and accelerate the formation of the sugar solution.

Another object of this invention is to provide a system according to the preceding object wherein at the point of admixture of the sugar, solvent and air, the flowing solvent is of flattened, ribbon form with a ribbon of sugar being cascaded into such ribbon of solvent, the air being introduced into the mixture at the merging point of the two ribbons to agitate and intermix the sugar and solvent.

A further object of this invention is to provide a system of the character described employing a converter into which dry sugar is fed by gravity, means for passing water into the converter and means for evacuating the converter, wherein the latter means is of greater capacity than the first means so that a mixture of sugar, water and air is evacuated from the converter.

Another object of this invention is to provide a dry sugar unloading and converting system including a converter adapted to be attached to the discharge hopper of a railway car or the like, which converter presents a chamber for receiving the dry sugar having inlet and outlet ducts associated therewith for directing a ribbon of water or water-sugar solution of varying percent sugar solids through the chamber beneath the incoming dry sugar and wherein the outlet duct has an opening into the chamber of greater area than the opening of the inlet duct into the chamber, there being discharge and evacuating pump means connected to the inlet and outlet ducts respectively in which the evacuating pump means is of greater capacity than the discharge pump means so that water, sugar and air are withdrawn from the chamber through said outlet duct.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

In the drawings:

Fig. 1 is a diagrammatic view of a system operating in accordance with this invention and illustrating the ribbon-flow of the water and the falling or cascading of crystals or granules at the point of admixture of water, granules and air;

Fig. 2 is a plan view of the system according to this invention;

Fig. 3 is an elevational view of the assembly shown in Fig. 1;

Fig. 4 is a plan view of the converter;

Fig. 5 is a side elevational view of the converter;

Fig. 6 is an end elevational view of the converter looking toward the same from the outlet end;

Figure 7:
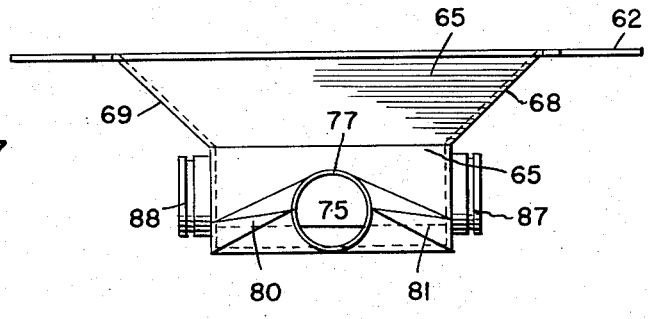
Fig. 7 is an end elevational view of the converter looking at the same from the inlet end.

With reference to Figs. 2 and 3, wherein the system is shown, it is preferred that the system employ a main storage and converting tank 10, and a reservoir 11, in this instance located within a suitable building, one wall of which is indicated by the reference character 12, the building being located next to a railroad siding indicated generally by the reference character 13.

Although the system will be described as for use in unloading railway bulk sugar cars, it is to be understood that a bulk sugar truck or other container may be unloaded in a similar manner.

The system has essentially one tank 10, a converter-evacuating positive displacement pump 14 such as a Moyna pump driven by suitable means from an associated motor 15, a converter-supplying positive displacement pump 16, such as a Moyna pump, driven by motor 17, a converter assembly indicated generally by the reference character 18 which receives the dry bulk sugar directly from the railway car and an air bleed or protector mechanism indicated generally by the reference character 19.

For the purpose of the installation shown, the inlet of the converter-supplying pump 16 is connected to tank 10 by means of suitable piping 20 having valves 21 and 22 therein and this pumping system terminating in an intake foot 23 within the tank 10 as shown most clearly in Fig. 3. The outlet of the pump 16 is connected to piping 24 which extends therefrom outside the wall 12 where it terminates in a shut-off valve 25 and coupling means to which is connected a length of flexible piping or conduit 26, the flexible line extending to the inlet side of the converter 18 as will be hereinafter more clearly set forth.

The converter-evacuating pump 14, on the other hand, has its inlet connected through suitable piping 27 which extends to the outside of the wall 12 to terminate in a shut-off valve 28 and in coupling means whereby the flexible conduit 29 is attached thereto, the flexible conduit being connected to the outlet side of the converter 18, also as set forth hereinafter. Also connected to the piping 27 is the air bleed and protector assemblage 19, the purpose of which will be presently set forth.

The outlet of the evacuating pump 14 is connected to a conduit of pipe 30 which tees into the pipe 31 which discharges into tanks 10 and 11 through the two branch sections 32 and 33, each of which branches has a shut-off valve associated therewith such as those indicated by the reference characters 34 and 35.

The pipe line 31 has a shut-off valve 36 located upstream from the point at which the pipe line 30 connects therewith and still further upstream is a T-connection 37 at which point the outlet 38 of a secondary supply pump 39 is connected to the line 31. Also connected to the line 31 through the fitting 37 is a discharge line 40 having a shut-off valve 41 therein.

The inlet 42 of the secondary supply pump 39, also preferably a constant displacement pump, incorporates a shut-off valve 43 and is connected through the coupling member 44 to a line 45 extending into the tank 11 and including the shut-off valve 46 and to the line 47 which extends therefrom for connection to the previously mentioned line 20 and which includes the shut-off valve 48. The secondary supply pump 39 is driven by suitable motor 49, each of the tanks 10 and 11 being connected to a water supply line 50 through the two branch sections 51 and 52 which include the shut-off valves 53 and 54.

Figure 8:
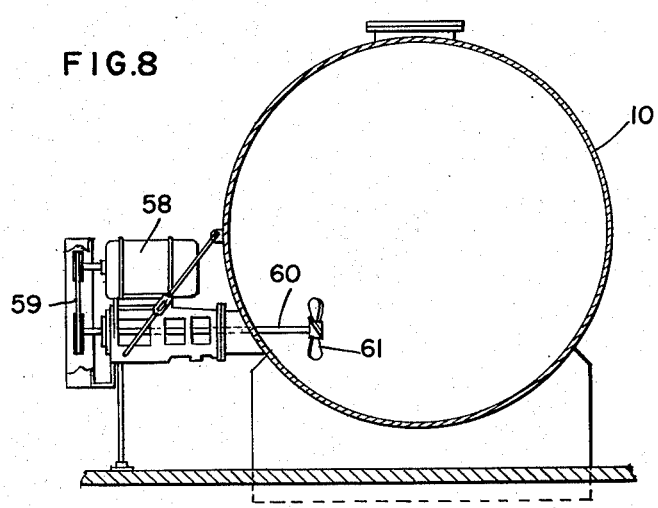
Fig. 8 is a transverse vertical section taken through one of the tanks.

The tank 10 may have a plurality of agitating units 55, 56 and 57 associated therewith. The make and location of the agitating unit or units is optional depending upon specific installation. Each of the units is mounted on the outer surface at one side of the tank as shown most clearly in Fig. 2 and each unit includes a suitable source of motive power 58 having driving connection as, for example, through a belt 59, see Fig. 8, to a shaft 60 which extends into the tank and has fixed on the inner end thereof an agitating blade assembly 61. Of course, appropriate packing and sealing means must be associated with the shaft 60 to prevent leakage around the shaft.

Referring at this point more particularly to Figs. 4-7 inclusive, the details of the converter assembly 18 will become apparent. The converter includes an upper attaching disc 62 having a plurality of circumferentially spaced notches in its peripheral edge for quick and ready attachment to the discharge hopper flange of the associated railway car. The disc 62 is provided with a rectangular opening 64 and connected to the edges defining the same are a plurality of wall portions defining a chamber for receiving dry sugar from the discharge hopper of the railway car. All of these wall portions are sloped inwardly toward each other but in a predetermined relationship to achieve a cascading ribbon or fall of crystals or granules as is illustrated in Fig. 1. For instance, the front wall portion 65 slopes downwardly and inwardly and terminates in a horizontal edge 66 spaced a slight distance above the bottom wall portion 67 which defines the bottom of the chamber whereas the two side walls 68 and 69 slope downwardly and inwardly to join at 70 with the vertical side wall portions 71 and 72 which are connected at their lower edges to the bottom wall 67. The rear wall portion 73 slopes downwardly and inwardly and terminates in its inner edge 74 spaced above the previously mentioned edge 66 but laterally to one side thereof as is shown most clearly in Fig. 5. The various walls 65, 68, 69 and 73 are, of course, all joined together at their adjacent edges.

Extending in opposite directions from the main body portion of the converter defining the chamber are the inlet and outlet conduits, pipes, or ducts 75 and 76 respectively, each of which presents at its free end portion a cylindrical mouth 77 to which the flexible conduits 26 and 29 are connected. Preferably, the connection between the flexible conduits and the cylindrical mouths 77 is of the quick-disconnect type. The inlet duct 75 effects a transition between the circular opening presented by its mouth 77 to the rectangular opening where the duct joins the lower portion of the main body of the converter. The upper edge of the rectangular opening is defined by the previously mentioned lower edge 66 of the wall 65 whereas the lower edge is defined by the bottom wall 67 and the opposite side edges by the two vertical side wall portions 71 and 72.

Inbetween the mouth or collar 77 and the juncture of the duct 75 with the main body portion, the duct includes upper and lower sections 78 and 79 which are semi-circular at the collar 77 and which are continuously flattened therefrom to the point of juncture with the main body of the converter. Flat side wall portions 80 and 81 of triangular shape complete the closure for the duct 75 between the lower and upper edges of the sections 78 and 79 respectively.

The outlet duct 76 incorporates a flat upper wall section 82 and a flat bottom wall section 83 and opposite flat side wall portions 84 and 85. The top section 82 tapers slightly downwardly from its point of juncture at the edge 74 of the wall 73 with the main body of the converter to the collar or mouth 77 and both of the side walls 84 and 85 likewise taper in converging fashion toward the mouth 77. To effect smooth convergence between the various walls 82—85 and the mouth 77, a dove-tail conical portion 86 is interposed therebetween.

Window members 87 and 88 are connected to the opposite side wall sections 84 and 85 of the outlet duct 76 and each has a transparent window 89 associated therewith so that the mixing action within the converter may be observed at all times.

Figure 9:
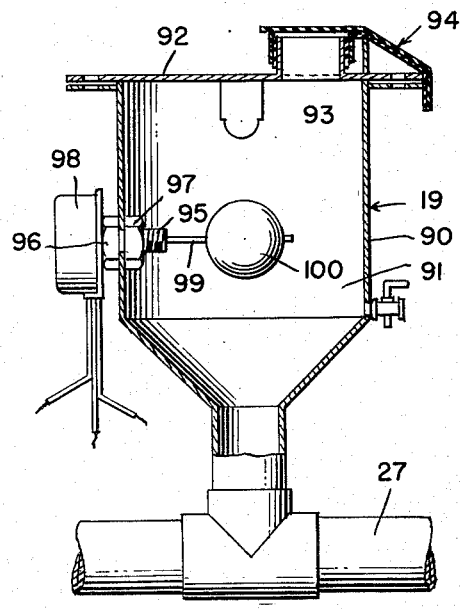
Fig. 9 is a vertical section taken through the air bleed and protector assembly.

Referring to Fig. 9, the protector or air bleed assembly 19 will be seen to consist of the casing 90 providing a chamber 91 having a removable cover 92 including an opening therein defined by the collar 93. A neoprene bleed valve 94 fits over the collar 93 to vent or bleed air from the system as will be presently described. Projecting through the side wall of the casing 90 is a threaded nipple 95 suitably secured thereto as by the nuts 96 and 97 and which nipple is integral with a switch element 98 which controls one or more of the various pumps in the system. Such switch is float operated and is actuated through the medium of a float rod 99 having a float ball 100 thereon which will actuate the switch to a closed position and shut down the pumps should the level of liquid within the converter rise above a predetermined level, the purpose of which will be presently apparent. As previously described in connection with Fig. 3, the protector 19 is connected to the inlet line 27 of the evacuating pump 14.

It will be noted that in the converter, the rectangular opening at the juncture of the outlet duct 76 and the main body portion of the converter is of substantially larger area than the area of the opening between the inlet duct 75 and the main body portion. After the converter has been secured to the associated discharge hopper of the railway car or the like, dry sugar is fed by gravity into the chamber defined by the main body portion of the converter and the system is adjusted so that liquid is supplied to the inlet duct 75 from the converter-supply pump 16. The inlet duct 75 forces the incoming water to be discharged in ribbon-like fashion along the bottom wall 67 of the converter chamber to undermine and carry away some of the bulk sugar therein. Since the ribbon of water flows smoothly along the bottom wall 67 and the bottom wall 83 of the outlet duct 76, the ribbon of water effects a scavenging action on the sugar within the chamber and carries a maximum amount of dry sugar away out through the outlet duct 76. It has been found essential for proper operation of the system that a certain amount of air be sucked in along with the sugar incoming to the water which prevents dry sugar from floating on a ribbon of flowing solution so it is of necessity that the outlet duct opening be sufficiently large to permit the proper volumes of water, sugar and air to pass therethrough. To further enhance this effect, the converter-evacuation pump 14 is of considerably greater capacity than the supply pump 16 and it has been found that an optimum condition exists when air is drawn into the system at the mixing point in a proportion of about 140-150% air to sugar, by volume, the volume of sugar being taken as that of a cake of sugar with no air spaces or voids. Consequently, the evacuating pump 14 must be of sufficiently large capacity to draw in a quantity of air into and to flow along with the sugar stream. The air drawn into the system at the mixing point causes a violent agitation which mixes the incoming dry sugar and water as it passes out through the outlet duct 76 and expedites and accelerates the formation of a sugar-water solution. The dry sugar is introduced into the ribbon of liquid at a maximum rate so that approximately the desired percentage of water and sugar are brought into contact at the mixing point.

In the operation of the system, the tank 10 is provided with a supply of water from the source 50 by opening the valve 52 and the valves 48 and 46 are closed while valves 21 and 22 are opened to permit the supply or discharge pump 16 to pump water from the tank 10 into the outlet line 24 and thence to the inlet side of the converter through the flexible conduit 26, the valve 25 of course, being opened.

The mixture of sugar or other solids in granular form, and water, and air then passes out through the flexible conduit 29. The sugar-water mixture then passes through the evacuating pump 14 and from this point through the piping 30 to the pipe 31 and into the tank 10, the valve 34 being closed while the valve 35 is open. Also, the valve 36 is closed. After the railway car is completely unloaded, the supply of liquid from the pump 16 is shut off. Final dissolving of the dry bulk sugar is accomplished by virtue of the various agitator units 55—57 within the tank 10. In the interest of sanitary procedure, suitable bacteria destroying lights may be employed within the interior of the tanks 10 and 11.

Aside from the air bleed action of the assembly 19, the same acts to prevent flooding of the system. For example, if the system becomes flooded between the evacuating pump and the supply pump, the level of solution will rise within the assembly 19 and actuates the float 100 to shut down either the supply pump or the supply pump and the evacuating pump but preferably the former only. This protects the system against water rising within the chamber of the converter and hence into the railway car as might be occasioned by clogging or plugging of the outlet ducts 76 or the flexible conduit 29 or piping 27.

From one viewpoint, the system operates on the principle of introducing into the liquid at the point of mixing dry bulk sugar, or other granulated solids, to accomplish this without requiring or necessitating the use of heated water as is used in conventional liquid sugar preparing system. Fig. 1 illustrates the principle by which the rapidity of mixing occurs. In this figure, the ribbon of flowing solvent is clearly shown as is the ribbon of cascading crystals or fall of granules and the introduction of air into the solution as occasioned by the use of a pump of greater displacement on the downstream side of the point of mixing than on the upstream side is also graphically depicted. This figure also shows the storage and dissolving tank in closed circuit with the converter or place of mixing by means of two pumps of which the evacuating pump has greater capacity than the supply pump whereby automatic proportional regulation of the feed of granules to the water is effected.

We claim:

1. A system for unloading dry sugar from storage comprising a discharge pump having an inlet conduit connected to a sugar-solvent supply and a discharge conduit, an evacuating pump having an inlet conduit for receiving a mixture of sugar and its solvent and an outlet, a converter including a main body portion defining a chamber for receiving dry sugar and air and oppositely extending ducts connected to and opening into said chamber, one of said ducts being connected to said outlet conduit of the discharge pump and the other duct being connected to the inlet of said evacuating pump, said one duct defining a transition passage presenting a circular inlet mouth at the free end thereof and a rectangular opening at its juncture with said main body portion to issue a ribbon of water into said chamber, means for discharging dry sugar into said ribbon of water within said converter chamber, the other duct having an opening into said converter chamber which is of greater area than the rectangular opening of said one duct thereinto, and said evacuating pump having a greater capacity than the discharge pump so that solvent, sugar and air are expelled through said other duct.

2. In a system for unloading dry sugar and converting it into liquid sugar, a converter including a chamber into which dry sugar is fed by gravity, an inlet and an outlet duct communicating with said chamber, pump means connected to said inlet for introducing sugar-solvent thereinto, and pump means connected to said outlet for evacuating solvent and sugar therethrough, the capacity of the second mentioned pump means being greater than the capacity of the first mentioned pump means to evacuate air along with the sugar and solvent through said outlet duct.

3. In a system for unloading dry sugar and converting it into liquid sugar, a converter for receiving dry sugar, a supply pump for introducing sugar-solvent into said converter, and an evacuating pump for withdrawing sugar, solvent and air from said converter, said converter including a main body portion defining a chamber for receiving the dry sugar and having a flat bottom wall, an inlet duct projecting horizontally from said main body portion and to which the outlet of said supply pump is connected, an outlet duct projecting horizontally from said main body portion and to which the inlet of said evacuating pump is connected, said ducts being positioned to extend in opposite directions and each presenting a cylindrical mouth at its free end, conduit means connecting said cylindrical mouths of said inlet and outlet ducts respectively to the outlet of said supply pump and the inlet of said evacuating pump, the opening of said outlet duct into the chamber being of larger area than the opening of said inlet duct into the chamber, and said evacuating pump being of greater capacity than the supply pump.

4. A system for unloading dry bulk sugar, comprising a converter providing a chamber for receiving dry sugar and having inlet and outlet ducts connected therewith, a supply pump connected to said inlet duct for forcing sugar-solvent under pressure through said chamber to carry away the dry sugar, an evacuation pump connected to said outlet duct, said evacuation pump being of greater capacity than the supply pump to evacuate a mixture of solvent, sugar and air through the outlet duct.

5. A system for unloading dry bulk sugar, comprising a converter providing a chamber for receiving dry sugar and having inlet and outlet ducts connected therewith, a supply pump connected to said inlet duct for forcing sugar-solvent under pressure through said chamber to carry away the dry sugar, an evacuation pump connected to said outlet duct, said evacuation pump being of greater capacity than the supply pump to evacuate a mixture of solvent, sugar and air through the outlet duct, said converter including a disc for attachment to a gravity discharge hopper, a main body portion including depending and inwardly inclined front, rear and side walls defining said chamber, and the inlet duct having a cylindrical mouth remote from the chamber, a progressively flattened arcuate bottom wall extending from such mouth to the chamber, a progressively flattened arcuate top wall extending from such mouth to the chamber and flat side walls at the juncture of the inlet duct and said main body portion, defining a transition passageway from said mouth to the chamber so that water is discharged in ribbon-like fashion into said chamber and along the bottom wall thereof to undermine and carry away the dry sugar.

6. A converter for unloading dry bulk crystals, comprising a disc for attachment to a gravity discharge hopper, a main body portion including depending and inwardly inclined front, rear and side walls attached to said disc and in register with an opening therein to define a sugar-receiving chamber inlet and outlet ducts extending in opposite directions from said front and rear walls respectively, and the inlet duct having a cylindrical mouth remote from the chamber, a progressively flattened arcuate bottom wall extending from such mouth to the chamber, a progressively flattened arcuate top wall extending from such mouth to the chamber and flat side walls at the juncture of the inlet duct and said main body portion, defining a transition passageway from said mouth to the chamber so that water is discharged in ribbon-like fashion into said chamber and along the bottom wall thereof to undermine and carry away the dry sugar.

7. The method of dissolving a dry soluble granular bulk product such as sugar, in a solvent liquid such as water, which comprises maintaining a stream of solvent flowing in constant displacement circulation between a tank and a supply of the granules, cascading crystals downwardly into the flowing stream of solvent, agitating the granules and solvent at their point of contact whereby the dry granules enter and are mixed with the flowing stream of solvent by sucking air into the granules and solvent at that point, enclosedly conveying the mixture of solvent and granules as well as air back to the tank whereat dissolution of the granules is completed.

8. The method according to claim 7, wherein the quantity of granules fed to the solvent is greater than the ability of the flowing stream of solvent to carry them away whereby the quantity of granules taken away by the stream is self-regulating.

9. The method according to claim 7, wherein the liquid solvent in circulation is circulated in cylindrical form through a pipe but at the point of contact with the cascading granules is flattened and spread out to be in ribbon form.

10. The method according to claim 7, wherein at the point of contact of the cascading granules and the stream of solvent, they are both flattened to assume ribbon form.

11. In the method according to claim 7, as applied to sugar as the granules and water as the solvent, completing the dissolution to yield a 66.5 Brix liquid sugar.

12. In the method according to claim 7 as applied to sugar as the granules and water as the solvent, controlling the temperature at the point of contact of the sugar with the air and water to lie in a range of from 17° F. to an upper limit whereat there is minimized excessive condensation in the mixture and consequent growth of bacteria.

13. A system for unloading and converting granulated sugar and other solids in granulated form, comprising a storage tank, a source of water for the granules connected with the tank, and a converter assembly having a chamber open at its top for receiving granules falling thereinto by gravity provided with a liquid-conveying inlet conduit and a liquid-conveying outlet conduit, a supply pump having its intake connected with the tank for drawing liquid therefrom and its outlet connected with the inlet conduit of the chamber for supplying water thereto, and an evacuating pump having proportioned greater capacity than that of the supply pump while having its intake connected with the outlet conduit of the chamber for drawing water and granulated solids material in admixture from the chamber, whereby the admixed material from the chamber is conveyed to the tank for completing conversion of the solid material and for recycling a quantity of the mixture from the tank to and through the chamber and also whereby the proportion by which the capacity of the evacuating pump is larger than that of the supply pump determines the rate of feed of the granulated solid material into the liquid in the tank and thus the proportion of solids to water passing to the tank.

References Cited in the file of this patent

UNITED STATES PATENTS

| | | |
|---|---|---|
| 1,411,934 | Rankin | Apr. 4, 1922 |
| 1,568,117 | Whitman | Jan. 5, 1926 |
| 2,224,355 | Mooler | Dec. 10, 1940 |